May 27, 1969  J. R. DODGSON ET AL  3,446,518
SELECTIVELY EXTENSIBLE TELESCOPING HITCH LINK
Filed May 4, 1967  Sheet 1 of 3
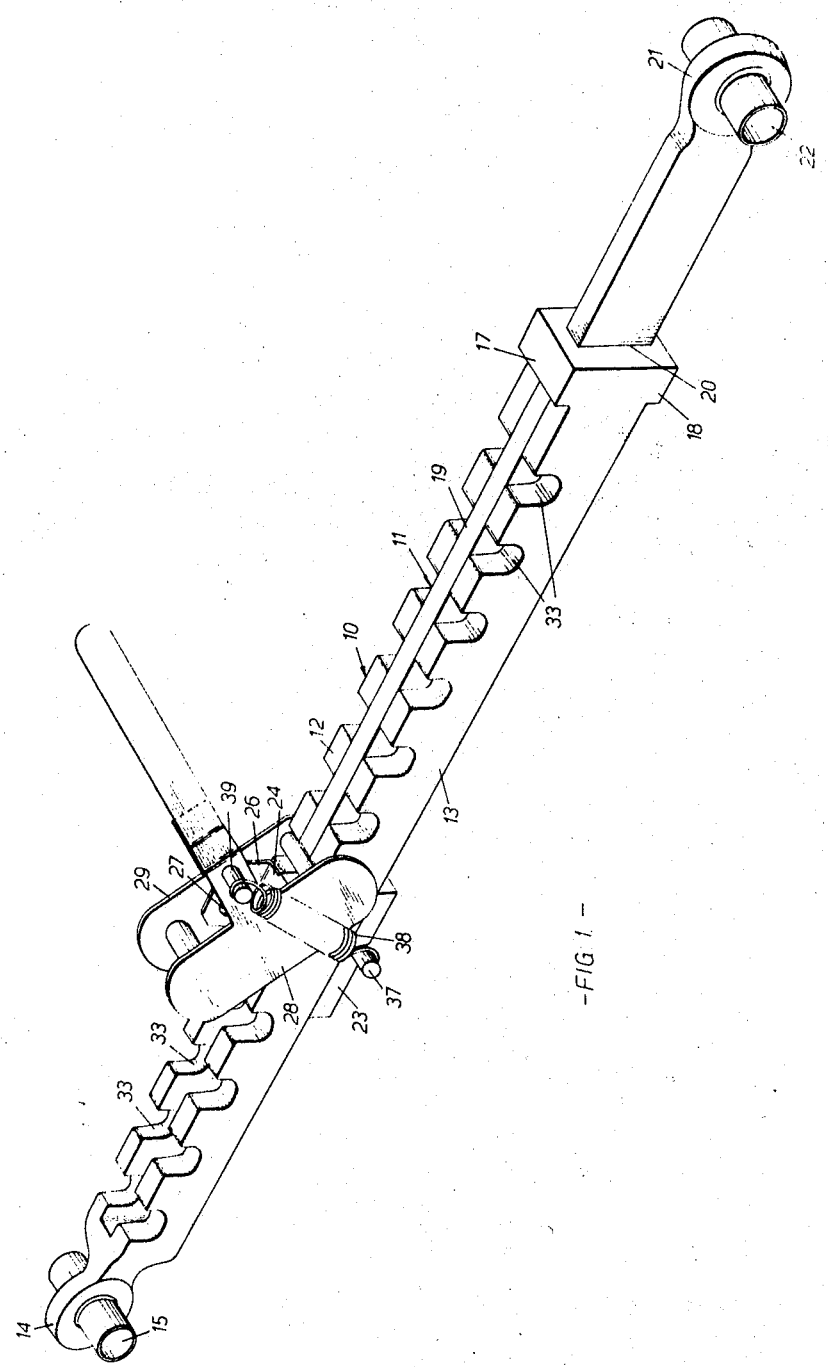
-FIG 1-
INVENTOR:
JOHN R. DODGSON
STANLEY R. SHARPE
BY
Norris & Bateman
ATTORNEYS

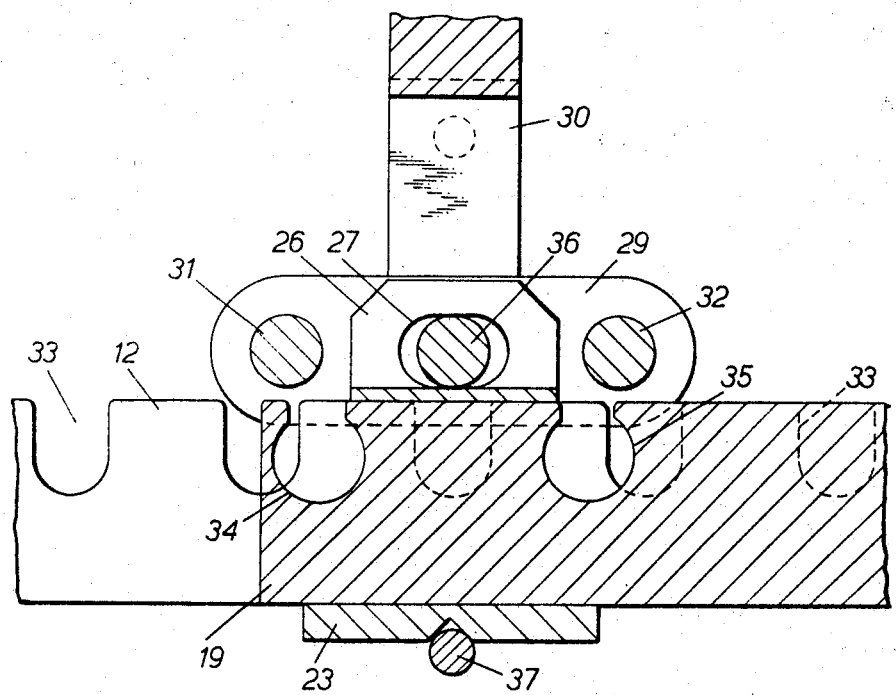
-FIG.2.-
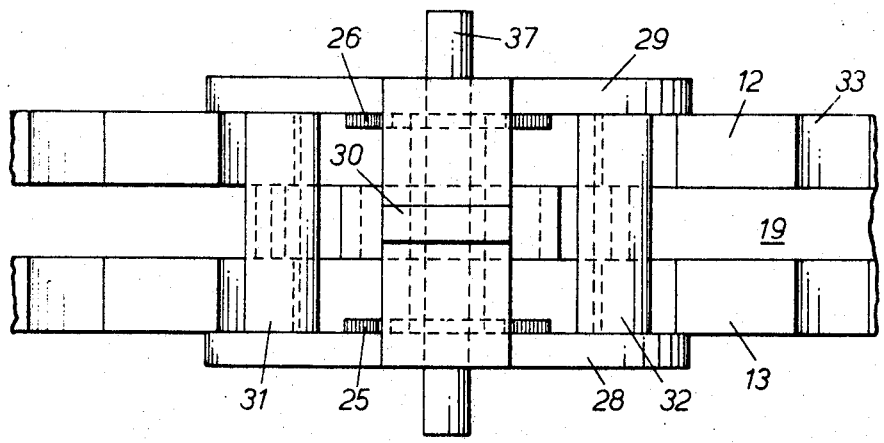
-FIG. 3.-

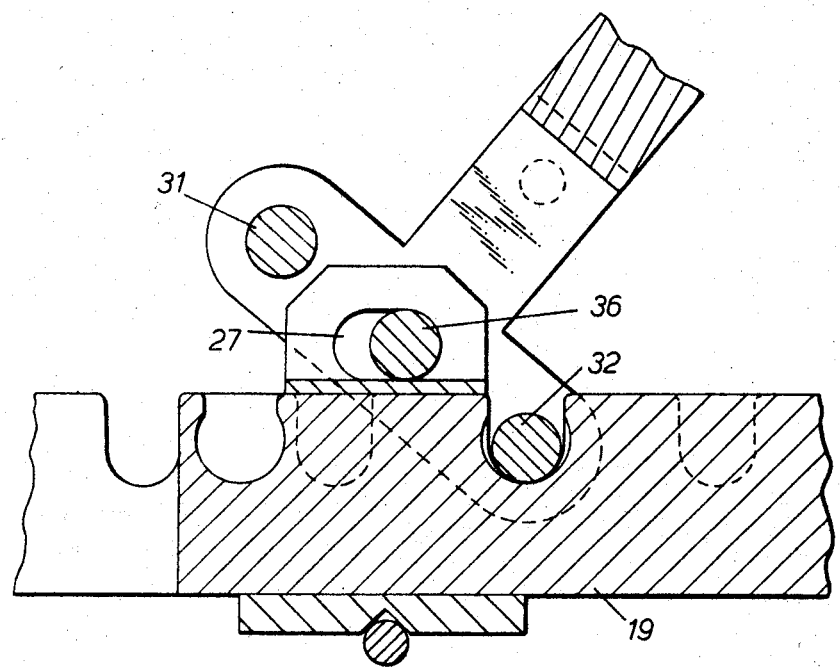
- FIG. 4. -
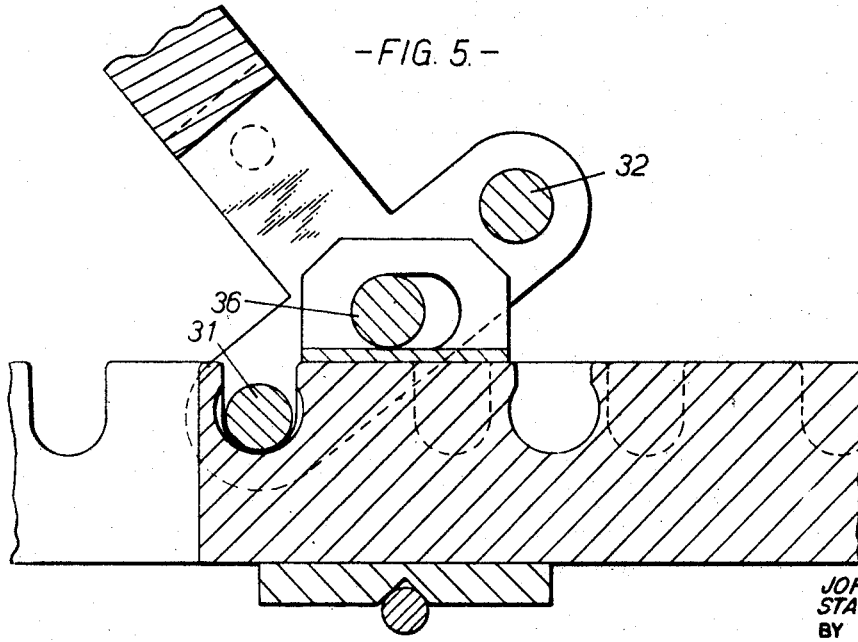
- FIG. 5. -
INVENTOR:
JOHN R. DODGSON
STANLEY R. SHARPE
BY
Norris & Bateman
ATTORNEYS United States Patent Office 3,446,518
Patented May 27, 1969

3,446,518
SELECTIVELY EXTENSIBLE TELESCOPING HITCH LINK
John R. Dodgson, Burneside, Staveley, near Kendall, and Stanley R. Sharpe, Warton, near Atherstone, England; said Dodgson assignor to Barsyke Limited, a corporation of Great Britain
Filed May 4, 1967, Ser. No. 636,122
Int. Cl. B60d 1/00; F16b 7/14; F16l 27/12
U.S. Cl. 280—482                    5 Claims

---

ABSTRACT OF THE DISCLOSURE

The invention comprises an extensible link which is adapted to be used to connect a tractor and a towed implement (e.g., an agricultural implement). The link has two longitudinal members one of which comprises two spaced apart bars and the other a single bar slidable between the spaced bars of the first member. One member has a series of notches and the other has two notches—the pitch of the two notches being different to that of the series. A securing member is pivoted on one of the longitudinal member and is spring loaded into either of two positions in each of which it locks the two longitudinal members by placing a rod in aligned notches.

---

The object of the present invention is to provide an extensible link which can be used for connecting implements such as agricultural implements or earth moving machinery to the rear of a tractor. Another object is to provide an improved trench cutting apparatus incorporating an extensible link.

According to this invention an extensible link for connecting an implement to a tractor comprises a first member having two parallel spaced-apart bars, and a second member having a single bar slidable longitudinally in the space between the two bars of the first member, one of the first and second members being adapted for connection to a tractor and the other being adapted for connection to an implement, one of the members having a series of lateral notches in its bar or bars, and the other having a lateral notch in its bar or bars, so that any one of the series of notches in the one member can be aligned with the notch in the other member, and a securing member having a rod which is engageable in the aligned notches of the first and second members to prevent relative movement between them, the securing members being movable to an inoperative position where its rod is out of engagement with the notches of the first and second members so as to permit relative longitudinal movement of those members.

Preferably the member other than the one with the series of notches has two notches, and the securing member has two rods alternatively movable into an operative position one being capable of engaging with one of the two notches and the other being capable of engaging with the other of the two notches, the pitch or the notches in the member with a series of notches being different from the pitch of the two notches in the other member, and neither being an exact multiple of the other, so that the two members can be locked together with at least some of the notches of the series aligned with either of the two notches to increase the number of effective lengths of the link above that which can be obtained with a single notch in one member.

According to a preferred feature of the invention, an agricultural or earth moving implement of the kind which is adapted to be towed behind or mounted on a tractor is adapted to be pivotally connected to the hydraulic arms of a tractor and has an extensible link which can be locked at any one of a series of effective length positions, pivotally connected at its forward end, for attachment to the top link of a tractor, whereby the pitch and/or working height of the implement can be adjusted. This arrangement permits two conditions of operation for the apparatus as follows:

(1) Extensible link locked, so that the implement can be swung about the pivotal axis of the tractor hydraulic link arms, and will be lifted bodily out of the ground or lowered bodily into the ground.

(2) Extensible link unlocked, so that it is free to extend or contract according to the forces applied to it by the implement and the tractor hydraulic link arms. In this position, the link is virtually cancelled, and the operation of the apparatus is exactly the same as it would be if no link were fitted. That is to say that the working pitch or height of the implement to the ground can be altered at will, by moving the tractor forwards or backwards or by raising or lowering the tractor's hydraulic link arms. The selected pitch or height can then be fixed at will by re-locking the extensible link in its new position. The un-locking of the extensible link therefore gives the operator in charge of the tractor mechanical control of the pitch of his implement in the ground without dismounting from the tractor.

One construction of an extensible link for connecting an implement to a tractor and its method of use will now be described by way of example of the invention, with reference to the accompanying drawings in which:

FIGURE 1 is a perspective view of the link,
FIGURE 2 is a longitudinal section through part of the link in the inoperative or unlocked position,
FIGURE 3 is a plan view of the parts shown in FIGURE 2,
FIGURE 4 is a view similar to FIGURE 2, but showing the parts in a first locked position, and
FIGURE 5 is a view similar to FIGURE 2, but showing the parts in a second locked position.

The link comprises an outer member 10 and an inner member 11, both of which are made of steel and are of sufficiently robust construction to stand up to the strains applied between a tractor and an implement such as an agricultural implement or earth moving machinery. The outer member 10 has two parallel and spaced-apart longitudinal bars 12 and 13 which are joined to each other at their ends as shown. At the front end of the outer member 10, there is a boss 14 which is formed with a part spherical bore to receive a hollow member 15 which can be threaded on to the top link pin of a tractor. This mounting permits the link to swing on the top link pin, and it also permits limited rocking of the link about axes at right angles to the axis of the link pin. At the rear end of the outer member there are shoulders 17 and 18 which act as stops for the inner member 11 as will be hereinafter described.

The inner member 11 comprises a single bar 19 which is a sliding fit between the two bars 12 and 13 of the outer member, and which projects through a hole 20 in the rear end of the outer member. At its rear end, the bar 19 has a boss 21 formed with a part spherical hole to receive a hollow member 22, which can be threaded on to a link pin of an agricultural implement. The link can, therefore, turn about its connection with the implement and rock to a limited extent about this connection, in the same way that it can turn and rock about its connection with the tractor. Therefore, the link has considerable freedom of angular inclination to allow it to couple a tractor and implement which may move relatively to each other in operation.

A plate 23 is welded to the underside of the bar 19 at its forward end, this plate engaging with the undersides of the bars 12 and 13. Also a bracket 24 is welded to the top of the bar 19 and engages with the top sides of the bars 12 and 13 so that the forward end of the inner member is located against vertical movement relatively to the outer member. As shown, the bracket 24 has upstanding side plates 25 and 26 each of which is formed with a horizontal slot 27.

The securing member, which forms an essential element of the invention, comprises two side plates 28 and 29 joined by a bridge piece, from which there projects a handle 30, and a pair of lateral rods 31 and 32 extending between the ends of the plates 28 and 29 the whole assembly being pivoted on a cross shaft 36 which rests in the slots 27. A series of notches 33 is formed in each of the bars 12 and 13, each notch extending across both bars and, as illustrated, the notches extend almost the complete length of the bars 12 and 13. A pair of similar notches 34 and 35 is formed in the bar 19 adjacent to the bracket 24, each of these notches 34 and 35 being somewhat undercut as illustrated in FIGURES 2, 4 and 5. The bar 19 can be adjusted until the notch 34 is in alignment with one of the notches 33, or it can be adjusted to bring the notch 35 into alignment with one of the notches 33, but the pitch of the two notches 35 and 34 is equal to one and a half times the pitch of the notches 33, so that the bar 19 has to be moved (relatively to the bars 12 and 13) a distance equal to one half the pitch of the notches 33 to change from the position where one notch 35 or 34 is in alignment with a notch 33 to the next adjacent position at which the other of the notches 34 and 35 is in alignment with a notch 33.

A peg 37 is welded to the underside of the plate 23 and projects on each side to provide anchor points for springs 38 (only one of which is visible in the drawings) the other ends of the springs being attached to pegs 39 projecting from the plates 28 and 29. These springs tend to pull the securing member into one of the two positions shown in FIGURES 4 and 5, the spring being fully extended when the handle 30 is upright (as shown in FIGURE 2) and the rods 31 and 32 are above the tops of the side bars 12 and 13. The spring arrangement is the well-known over-centre device wherein the loading of the spring always tends to pull the securing member into one of its locked positions, unless the handle 30 is held upright.

When the handle is held upright, the rods 31 and 32 are in their inoperative positions, and the bar 19 is free to slide relatively to the outer member 10. Consequently, the top link is virtually cancelled, because it can extend or contract freely. When the handle is allowed to fall to one side, the rod 32 engages in the notch 35 and in an aligned notch 33 in the outer member 10, so that the inner and outer members become locked together, the effective length of the link being determined by the position to which the member 19 has been moved to provide the alignment of notch 35 with the selected notch 33. Since the side walls of the notches are not arcs about the centre of the shaft 36, the latter moves in its slot 27 during movement of the rod 32 into the notch 35. When the securing member is tilted in the opposite direction (FIGURE 5) the rod 31 engages in the notch 34 and an aligned notch 33, but this must be half the pitch of the notches 33 displaced from any of the positions at which the rod 32 could fit into its notch 35 and one of the notches 33.

When either of the rods 31 and 32 is in the operative position, the inner and outer members are locked, and the length of the link is determined. It will be apparent that the rod 31 can engage in all but the two rearmost notches 33 of the member 10, and that the rod 32 can engage in all but the two foremost notches 33. The engagement of the bar 19 with the part joining the bars 12 and 13 at the front limits the forward movement of the bar 19 (i.e., the shortest effective length of the link) and the engagement of the rod 32 or the plate 23 with one or other of the shoulders 17 and 18 limits the rearward movement of the bar 19 (i.e., the longest effective length of the link).

It will be appreciated that the double rod arrangement on the securing member provides two effective lengths for almost all the notches 33. The pitch between the two notches 34 and 35 must not be an exact multiple of the pitch between the notches 33 to produce this effect. The securing member could have only a single rod 31 or 32, but then it would only provide a single position for each notch 33.

In use, the link may, for example, be connected between the top link of a tractor and the top link of a trench cutting machine of the kind which is pulled through the ground by the operation of the tractor hydraulic arms. When the securing member is put in the inoperative position, the top link can extend or contract freely according to the forces applied to it by the cutting apparatus and the tractor hydraulic link arms. When the link is locked, it becomes a rigid bar and the apparatus will be lifted when the tractor hydraulic arms are raised. It will be appreciated that the link can be used between a tractor and any kind of agricultural or earth moving implement, wherein the pitch and/or working height is relevant to the performance.

We claim:

1. An extensible top link for a tractor 3-point hitch, the link including a pair of mutually slidable members and means for securing said members together in any one of a number of mutually extended positions for resisting both tensile and compressive forces and for optionally allowing freedom of movement between said members, characterized in that said pair of mutually slidable members is constituted by a first member having two parallel spaced-apart bars and a second member having a single bar slidable longitudinally in the space between the two bars of said first member, one of said pair of members having a series of lateral notches in the edge or edges of its bar or bars and the other of the pair of members having two longitudinally spaced lateral notches in the edge or edges of its bar or bars as the case may be, the spacing of said two notches being different from the spacing of the notches in the member with the series of notches and neither spacing being an exact multiple of the other, means for securing said members together in any one of a number of mutually extended positions for resisting both tensile and compressive forces and for optionally allowing freedom of movement between said members being constituted by a securing member pivotally mounted on the member having only two lateral notches and being provided with two laterally extending parts capable of engaging respectively and alternatively with said two notches and simultaneously with aligned notches of the member with the series of notches, the securing member being movable to an inoperative position where both of said laterally extending parts are out of engagement with the notches of the pair of mutually slidable members.

2. An extensible top link as recited in claim 1, further characterised in that the notches in said one member and/or the notch in said other of the members have sides which are perpendicular to the longitudinal direction of relative movement between said members.

3. An extensible top link as recited in claim 1 further characterised in that the securing member is pivotally mounted on a cross shaft which is permitted limited movement longitudinally of the link to facilitate the engagement of its laterally extending part in the aligned notches.

4. An extensible top link as recited in claim 1, in which said securing member is resiliently urged into its operative position.

5. An extensible top link as recited in claim 4 in which said securing member is locked by a spring arranged so that it passes overcentre as said securing member is moved from one operative position to the other.

References Cited

UNITED STATES PATENTS

| 1,406,881 | 2/1922 | Lorenzen. | |
|---|---|---|---|
| 2,617,660 | 11/1952 | Hadlock | 287—58 X |
| 2,693,368 | 11/1954 | Petron | 280—482 |
| 2,894,766 | 7/1959 | Habriga | 280—482 |

LEO FRIAGLIA, *Primary Examiner.*

U.S. Cl. X.R.

285—303; 287—58